(12) United States Patent
Hsu et al.

(10) Patent No.: US 12,287,566 B2
(45) Date of Patent: Apr. 29, 2025

(54) OPTICAL SYSTEM

(71) Applicant: TDK TAIWAN CORP., Taoyuan (TW)

(72) Inventors: Chan-Jung Hsu, Taoyuan (TW); Chen-Hsin Huang, Taoyuan (TW); Chen-Hung Chao, Taoyuan (TW); Yi-Ho Chen, Taoyuan (TW); Kun-Shih Lin, Taoyuan (TW); Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 125 days.

(21) Appl. No.: 17/961,038

(22) Filed: Oct. 6, 2022

(65) Prior Publication Data

US 2023/0266637 A1 Aug. 24, 2023

Related U.S. Application Data

(60) Provisional application No. 63/312,987, filed on Feb. 23, 2022.

(30) Foreign Application Priority Data

Sep. 2, 2022 (CN) .......................... 202211074962.2

(51) Int. Cl.
*G03B 9/44* (2021.01)
*G02B 27/64* (2006.01)
*H02K 41/035* (2006.01)

(52) U.S. Cl.
CPC .............. *G03B 9/44* (2013.01); *G02B 27/646* (2013.01); *H02K 41/0354* (2013.01)

(58) Field of Classification Search
CPC .............. G03B 9/06; G03B 9/22; G03B 9/24
See application file for complete search history.

(56) References Cited

U.S. PATENT DOCUMENTS

2020/0301246 A1* 9/2020 Seo .................... H04N 23/55

\* cited by examiner

*Primary Examiner* — Noam Reisner
(74) *Attorney, Agent, or Firm* — MUNCY, GEISSLER, OLDS & LOWE, P.C.

(57) ABSTRACT

An optical system is provided and includes a first optical element driving mechanism, which includes a first fixed assembly, a first movable assembly, and a first driving assembly. The first movable assembly is configured to be connected to a first optical element, and the first movable assembly is movable relative to the first fixed assembly. The first movable assembly includes a first movable element and a second movable element. The first driving assembly is configured to drive the first movable assembly to move relative to the first fixed assembly. The first fixed assembly and the first movable assembly are arranged along a main axis, and the first driving assembly is configured to drive the second movable element to move along a first axis, thereby driving the first movable element to move around the main axis.

20 Claims, 14 Drawing Sheets

OPTICAL SYSTEM

CROSS REFERENCE TO RELATED APPLICATIONS

This application claims the benefit of U.S. Provisional Application No. 63/312,987, filed on Feb. 23, 2022, and China Patent Application No. 202211074962.2, filed Jul. 8, 2022, the entirety of which are incorporated by reference herein.

BACKGROUND OF THE DISCLOSURE

Field of the Disclosure

The present disclosure relates to an optical system, and in particular it relates to an optical system having an aperture structure.

Description of the Related Art

As technology has developed, many of today's electronic devices (such as smartphones) have a camera and video functionality. Using the camera modules disposed in electronic devices, users can use their electronic devices to capture photographs and record videos.

Today's design for electronic devices continues to follow the trend of miniaturization, meaning that the various components of the camera module and its structure must also be continuously reduced, so as to achieve miniaturization. In general, a driving mechanism in the camera module has a camera lens holder configured to hold a camera lens, and the driving mechanism can have the functions of auto focusing or optical image stabilization. In addition, the camera module can also be equipped with an aperture mechanism to adjust the amount of light. However, although the existing driving mechanism can achieve the aforementioned functions of photographing and video recording, they still cannot meet all of the users' needs.

Therefore, how to design a camera module that can perform auto-focus, optical anti-shake, adjust the amount of light and achieve miniaturization at the same time are topics nowadays that need to be discussed and solved.

BRIEF SUMMARY OF THE DISCLOSURE

Accordingly, one objective of the present disclosure is to provide an optical system to solve the above problems.

According to some embodiments of the disclosure, an optical system is provided and includes a first optical element driving mechanism, which includes a first fixed assembly, a first movable assembly, and a first driving assembly. The first movable assembly is configured to be connected to a first optical element, and the first movable assembly is movable relative to the first fixed assembly. The first movable assembly includes a first movable element and a second movable element. The first driving assembly is configured to drive the first movable assembly to move relative to the first fixed assembly. The first fixed assembly and the first movable assembly are arranged along a main axis, and the first driving assembly is configured to drive the second movable element to move along a first axis, thereby driving the first movable element to move around the main axis.

According to some embodiments, the optical system further includes a second optical element driving mechanism. The first optical element driving mechanism is disposed on the second optical element driving mechanism. The second optical element driving mechanism includes a second fixed assembly, a second movable assembly and a second driving assembly. The second movable assembly is configured to be connected to a second optical element. The second driving assembly is configured to drive the second movable assembly and the second optical element to move relative to the second fixed assembly. The second fixed assembly includes a casing and a second base. The casing is affixed to the second base to form an accommodation space. The accommodation space is configured to accommodate the second movable assembly and the second driving assembly. The casing surrounds a portion of the first optical element driving mechanism.

According to some embodiments, the second optical element driving mechanism further includes a circuit assembly electrically connected to the first driving assembly and the second driving assembly. The circuit assembly includes a substrate, a sharing element, a first circuit element and a second circuit element. The sharing element, the first circuit element and the second circuit element are integrally formed as one piece. The substrate is disposed on the second base. The sharing element, the first circuit element and the second circuit element each has a long strip-shaped structure.

According to some embodiments, the sharing element extends along a second axis from the substrate. The second axis is perpendicular to the first axis. The second axis is parallel to the main axis. The first circuit element is configured to be electrically connected to the first driving assembly. When viewed along the first axis, the first circuit element extends in a first direction from the sharing element. The second circuit element is configured to be electrically connected to a second position sensing element. When viewed along the first axis, the second circuit element extends in a second direction from the sharing element. The first direction is the opposite of the second direction.

According to some embodiments, the second movable assembly includes a second frame which is movable relative to the second base. A side groove is formed on a first side wall of the second frame and is configured to accommodate a portion of the circuit assembly. When viewed along the first axis, the side groove has a T-shaped structure. When viewed along the first axis, the sharing element, the first circuit element and the second circuit element form a T-shaped structure, corresponding to the side groove.

According to some embodiments, the first circuit element and the sharing element form a first arc structure. The second circuit element and the sharing element form a second arc structure. The first side wall forms a third arc structure and a fourth arc structure, respectively corresponding to the first arc structure and the second arc structure. The radius of curvature of the first arc structure is different from the radius of curvature of the third arc structure. The radius of curvature of the first arc structure is greater than the radius of curvature of the third arc structure.

According to some embodiments, the radius of curvature of the second arc structure is different from the radius of curvature of the fourth arc structure. The radius of curvature of the second arc structure is greater than the radius of curvature of the fourth arc structure.

According to some embodiments, when viewed along the first axis, a handle portion of the side groove extends along the second axis. When viewed along the first axis, the width of the handle portion in a third axis is greater than the width of the sharing element in the third axis. The third axis is perpendicular to the first axis and the second axis. When viewed along the second axis, the sharing element, the first circuit element and the second circuit element are not in contact with the first side wall.

According to some embodiments, the first circuit element includes a first extending portion and a first contact portion. The first extending portion is connected to the first contact portion. The first extending portion and the first contact portion extend in different directions. The first extending portion is not in contact with the first side wall. The first contact portion is in contact with a front side wall of the second frame. A first slot is formed on the front side wall, and a portion of the first contact portion is inserted into the first slot. The first contact portion is affixed to the second frame.

According to some embodiments, the second circuit element includes a second extending portion, a third extending portion, a curved portion and a second contact portion. The second extending portion is connected to the third extending portion. The second extending portion extends in a different direction than the third extending portion. The curved portion is connected between the second contact portion and the third extending portion. The curved portion extends in a different direction than the second contact portion and the third extending portion.

According to some embodiments, the second extending portion is not in contact with the first side wall. The third extending portion is not in contact with a rear side wall of the second frame. A portion of the curved portion is not in contact with the rear side wall. The second contact portion is in contact with the rear side wall.

According to some embodiments, a second slot is formed on the rear side wall, and a portion of the second contact portion is inserted into the second slot. When viewed along the main axis, the shortest distance between the first contact portion and the main axis is different from the shortest distance between the second contact portion and the main axis. When viewed along the main axis, the shortest distance between the first contact portion and the main axis is greater than the shortest distance between the second contact portion and the main axis. The second position sensing element is disposed on the second contact portion. A sensing magnet corresponding to the second position sensing element is disposed on the holder. When viewed along the main axis, the distance between the sensing magnet and the second contact portion in the third axis is less than the distance between the sensing magnet and the third extending portion in the third axis.

According to some embodiments, the second optical element driving mechanism further includes a blocking assembly disposed on the front side wall. When the second frame moves relative to the second base along the third axis, the blocking assembly is configured to be in contact with the casing. The blocking assembly includes at least one blocking element protruding from the front side wall along the third axis. The second optical element driving mechanism further includes two buffering elements. One of the two buffering elements is disposed between the first circuit element and the casing. The other of the two buffering elements is disposed between the second circuit element and the casing. The buffering element includes a gel.

According to some embodiments, the second frame has a receiving trench extending along the first axis. The second movable element is disposed in the receiving trench. The second movable element is configured to move along the first axis within the receiving trench. The first optical element driving mechanism further includes a driving member which is affixed to the second movable element. The driving member has a long strip-shaped structure extending along the second axis.

According to some embodiments, the first movable element has a first body and a clamping portion. When viewed along the main axis, the clamping portion has a U-shaped structure. The clamping portion radially extends from the first body. The clamping portion is configured to clamp the driving member. When the second movable element moves along the first axis, the driving member is configured to be in contact with the clamping portion to drive the first movable element to rotate around the main axis, thereby driving the first optical element to move relative to the first fixed assembly and the first movable assembly, so as to adjust the amount of external light entering the first optical element driving mechanism.

According to some embodiments, the second movable element has a second body. The second body has a long strip-shaped structure extending along the first axis. When viewed along the main axis, the length of the receiving trench in the first axis is greater than the length of the second body in the first axis. The receiving trench has a middle receiving portion and two side receiving portions. The two side receiving portions extend from the middle receiving portion along the first axis. The middle receiving portion is configured to accommodate the second body.

According to some embodiments, the second frame further includes at least three receiving grooves, extending along the first axis. The first optical element driving mechanism further includes a second rolling assembly disposed between the second movable element and the second frame. The second rolling assembly includes at least three second rolling elements, which are respectively disposed in the at least three receiving grooves. The second movable element moves along the first axis relative to the second frame by the second rolling elements. When viewed along the main axis, the second rolling elements form a triangle. The triangle is an isosceles triangle.

According to some embodiments, the first driving assembly includes two first magnetic elements fixedly disposed on the second movable element. The two first magnetic elements are arranged along the first axis. The second optical element driving mechanism further includes a magnetic member disposed in the receiving trench. In the second axis, the second movable element is located between the two first magnetic elements and the magnetic member. A magnetic attraction force is generated between the two first magnetic elements and the magnetic member, so that the second movable element is not separated from the receiving trench.

According to some embodiments, the first optical element driving mechanism further includes a blocking member having a long strip-shaped structure extending along the first axis. The blocking member is fixedly arranged in the two side receiving portions. The second movable element further includes two receiving structures disposed on opposite sides of the second body. The blocking member is suspended in the two receiving structures. The blocking member is not in contact with the receiving structures. The blocking member is not in contact with the second body.

According to some embodiments, when viewed along the second axis, the two first magnetic elements overlap the magnetic member. When viewed along the second axis, the area of the magnetic member is larger than the total area of the two first magnetic elements. When viewed along the second axis, the blocking member overlaps the two first magnetic elements. When viewed along the second axis, the blocking member does not overlap the driving member.

When viewed along the second axis, the clamping portion overlaps a portion of the blocking member. When viewed along the second axis, the length of the blocking member in the first axis is greater than the length of the second body in the first axis.

The present disclosure provides an optical system including a first optical element driving mechanism and a second optical element driving mechanism. The first optical element driving mechanism may serve as an aperture mechanism, configured to adjust the amount of light entering the optical system. The second optical element driving mechanism can achieve the functions of auto-focusing (AF) and optical image stabilization (OIS).

In some embodiments, when the second movable element is driven to move along the first axis, the driving member is configured to be in contact with the clamping portion to drive the first movable element to rotate around the main axis, thereby drive the first optical elements to adjust the size of the aperture. It is worth noting that, the second movable element is disposed in the second frame of the second optical element driving mechanism, so the purpose of miniaturization can be achieved. Furthermore, based on the configurations of the second movable element, the driving member and the first movable element, the size of the aperture of the first optical element driving mechanism can be continuously changed.

In addition, the first contact portion of the circuit assembly is affixed to the second frame, and the first position sensing element is disposed on the first contact portion. Therefore, when the second frame moves relative to the second base, the distance between the first position sensing element and the corresponding first magnetic element in the third axis remains fixed, so that the sensing accuracy of the first position sensing element can be increased.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
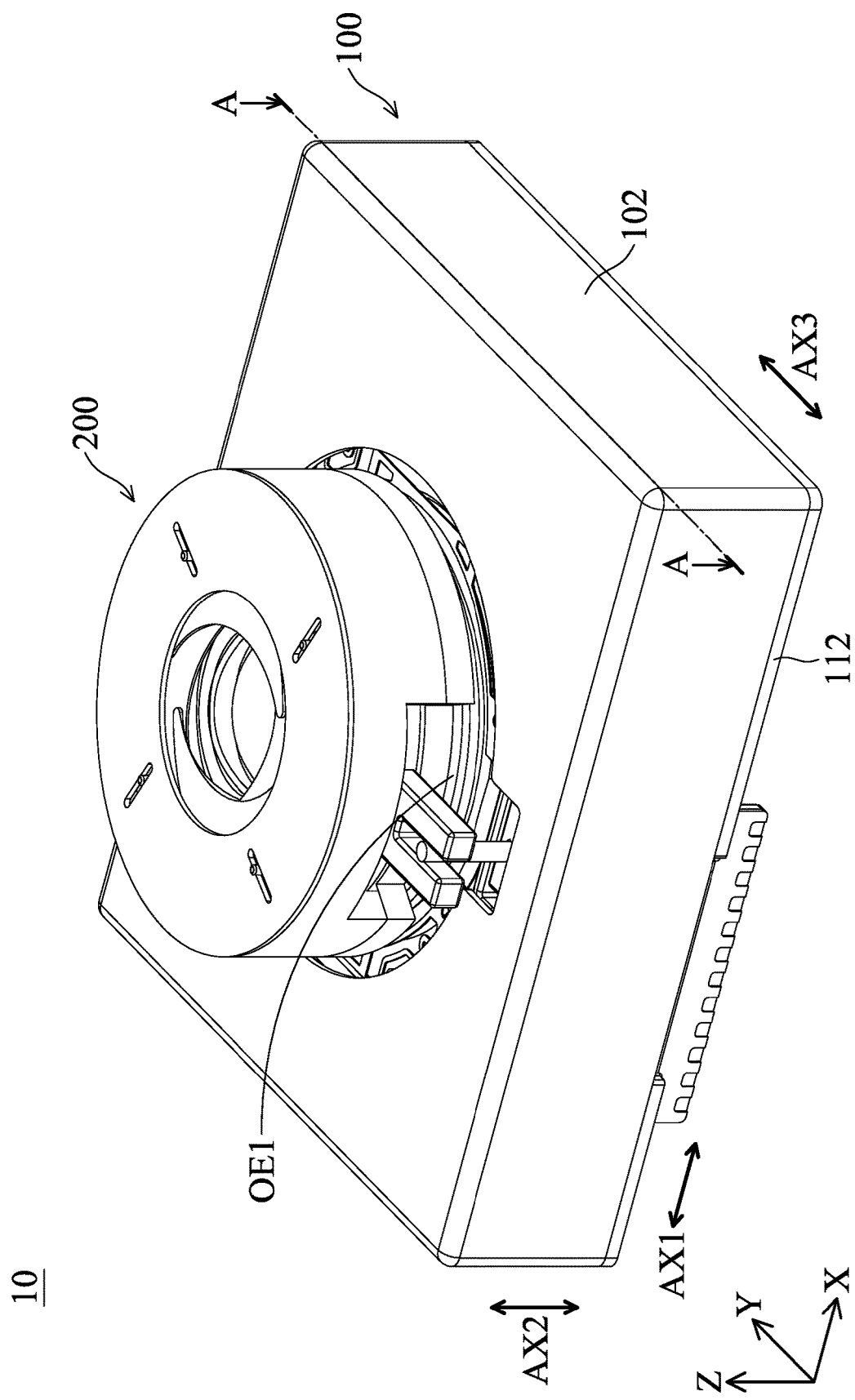
FIG. 1 is a schematic diagram of an optical system 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
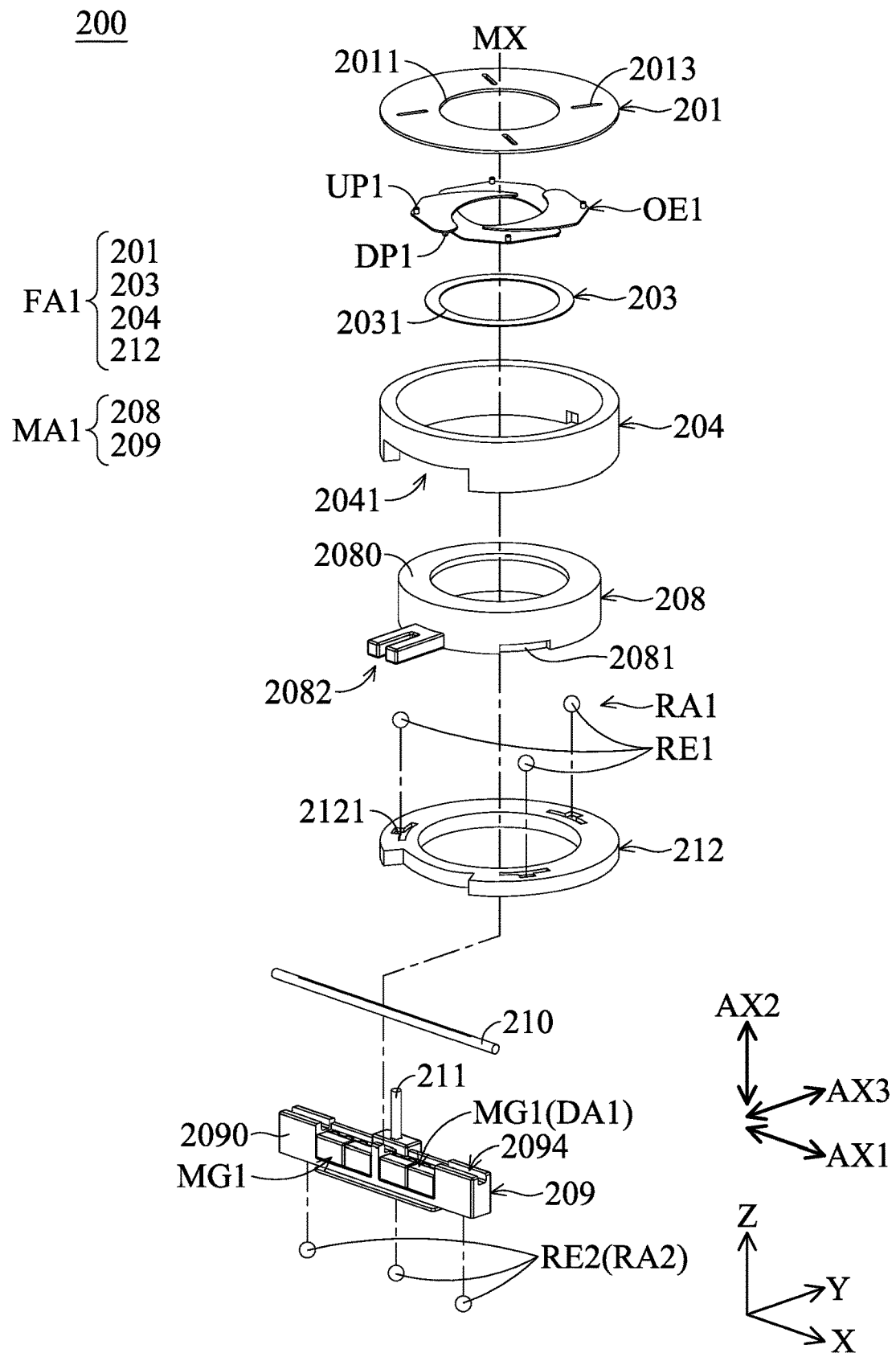
FIG. 2 is an exploded diagram of a first optical element driving mechanism 200 according to an embodiment of the present disclosure.
Figure 3:
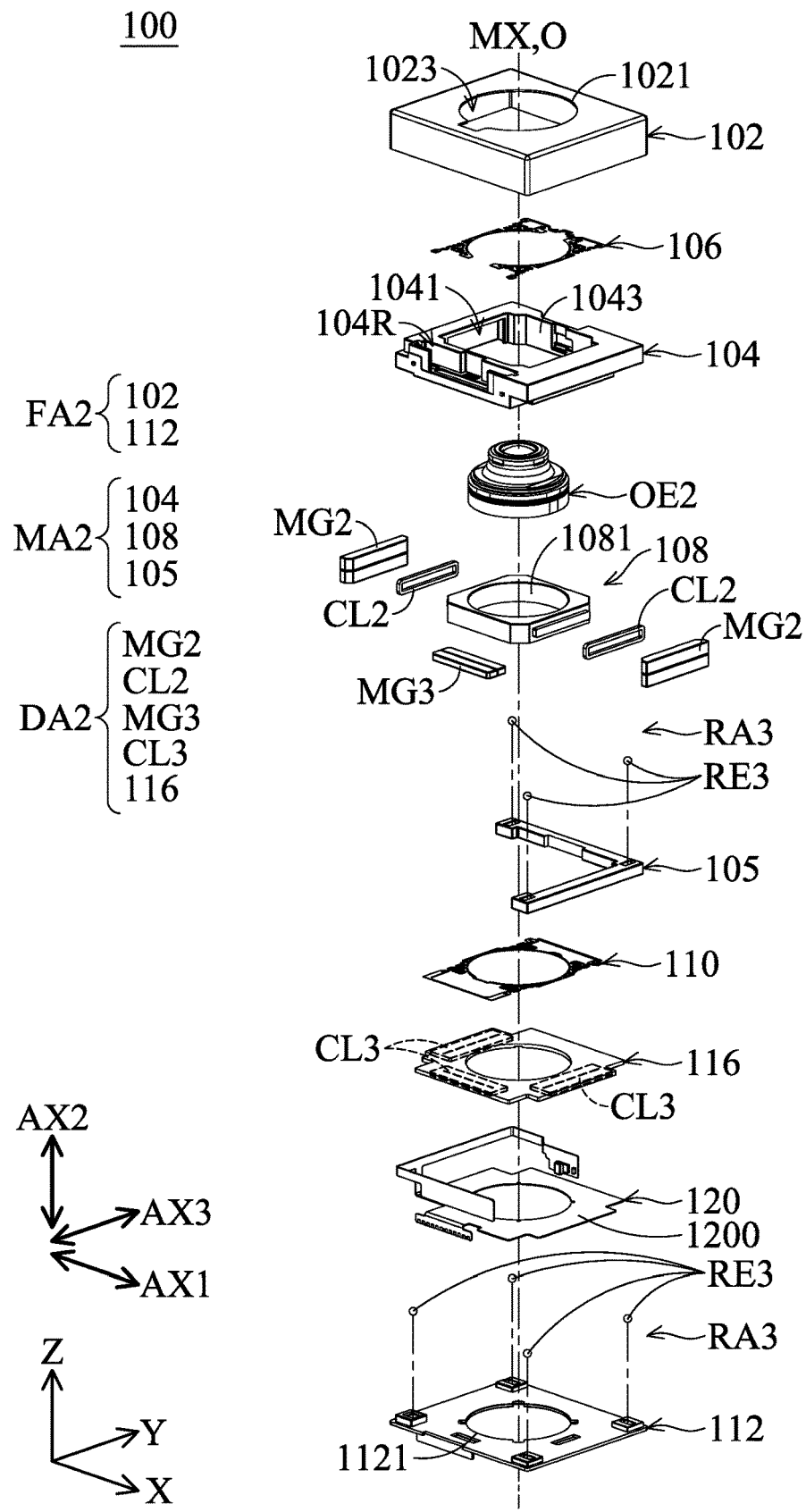
FIG. 3 is an exploded diagram of a second optical element driving mechanism 100 according to an embodiment of the present disclosure.

Please refer to FIG. 1 to FIG. 3. FIG. 1 is a schematic diagram of an optical system 10 according to an embodiment of the present disclosure, FIG. 2 is an exploded diagram of a first optical element driving mechanism 200 according to an embodiment of the present disclosure, and FIG. 3 is an exploded diagram of a second optical element driving mechanism 100 according to an embodiment of the present disclosure. The optical system 10 can be an optical camera system and can be configured to hold and drive an optical element. The optical system 10 can be installed in various electronic devices or portable electronic devices, such as a smartphone, for allowing a user to perform the image capturing function. In this embodiment, the optical system 10 can be a voice coil motor (VCM) with an auto-focusing (AF) function, but it is not limited thereto. In other embodiments, the optical system 10 can also perform the functions of auto-focusing and optical image stabilization (OIS).

In this embodiment, the optical system 10 may include the first optical element driving mechanism 200 and the second optical element driving mechanism 100. The first optical element driving mechanism 200 may serve as an aperture mechanism, configured to adjust the amount of light entering the optical system 10. The second optical element driving mechanism 100 can be the aforementioned voice coil motor, so that the optical system 10 can have auto focus (AF) and optical anti-shake (OIS) functions. In this embodiment, the first optical element driving mechanism 200 is disposed on the second optical element driving mechanism 100.

The first optical element driving mechanism 200 includes a first fixed assembly FA1, a first movable assembly MA1, and a first driving assembly DA1. The first movable assembly MA1 is configured to be connected to at least one first optical element OE1, and the first movable assembly MA1 is movable relative to the first fixed assembly FA1. The first movable assembly MA1 may include a first movable element 208 and a second movable element 209. The first driving assembly DA1 is configured to drive the first movable assembly MA1 to move relative to the first fixed assembly FA1.

As shown in FIG. 2, the first fixed assembly FA1 and the first movable assembly MA1 are arranged along a main axis MX, and the first driving assembly DA1 is configured to drive the second movable element 209 to move along a first axis AX1 (the X-axis), thereby driving the first movable element 208 to move around the main axis MX.

The first fixed assembly FA1 may include an outer shielding member 201, an inner shielding member 203, a first frame 204 and a first base 212. The first frame 204 is affixed to the first base 212, the outer shielding member 201 is affixed to the first frame 204, and the first frame 204 is located between the outer shielding member 201 and the first base 212. The inner shielding member 203 is disposed between the outer shielding member 201 and the first movable element 208. For example, the inner shielding member 203 can be disposed on the first movable element 208 or the first frame 204.

When viewed along the main axis MX, the outer shielding member 201 has a ring structure and a first outer opening 2011. When viewed along the main axis MX, the inner shielding member 203 has a ring structure and a first inner opening 2031. The maximum size of the first outer opening 2011 is different from the maximum size of the first inner opening 2031. For example, the maximum size of the first outer opening 2011 is greater than the maximum size of the first inner opening 2031.

Furthermore, the first movable element 208 is disposed in the first frame 204, and the first movable element 208 is rotatable around the main axis MX relative to the first frame 204. Specifically, the first optical element driving mechanism 200 may further include a first rolling assembly RA1 disposed between the first movable element 208 and the first base 212.

In this embodiment, the first rolling assembly RA1 includes at least three first rolling elements RE1. The first rolling element RE1 is, for example, a sphere, and is disposed in a groove 2121 of the first base 212 and in a groove 2081 of the first movable element 208, so that the first movable element 208 rotates around the main axis MX relative to the first base 212 and the first frame 204 by these first rolling elements RE1.

In this embodiment, the first optical element driving mechanism 200 may include four first optical elements OE1, which are movably connected to the first movable element 208. The number of the first optical element OE1 is not limited to this embodiment. When the first movable element 208 rotates around the main axis MX, the first optical element OE1 can move relative to the first fixed assembly FA1 and the first movable assembly MA1, thereby adjusting the amount of external light entering the first optical element driving mechanism 200 from the exterior.

Specifically, four first guiding grooves 2013 are formed on the outer shielding member 201, and each first optical element OE1 has a first upper protruding pillar UP1 and a first lower protruding pillar DP1. When viewed along the main axis MX, the first upper protruding pillar UP1 does not overlap the first lower protruding pillar DP1.

The first lower protruding pillar DP1 is configured to insert the first movable element 208, and the first guiding groove 2013 is configured to accommodate the corresponding first upper protruding pillar UP1. When the first movable element 208 rotates around the main axis MX, the first optical element OE1 rotates around the first lower protruding pillar DP1, and the first upper protruding pillar UP1 is configured to move along the first guiding groove 2013, so that the first optical element OE1 selectively blocks the first inner opening 2031.

It is worth noting that when viewed along the main axis MX, the extending direction of the first guiding groove 2013 deviates from the center (the main axis MX) of the outer shielding member 201.

Furthermore, the second movable element 209 is disposed in a second frame 104 of a second movable assembly MA2 of the second optical element driving mechanism 100. Specifically, the second frame 104 has a receiving trench 104R extending along the first axis AX1, and the second movable element 209 is disposed in the receiving trench 104R. The second movable element 209 is configured to move along the first axis AX1 within the receiving trench 104R.

As shown in FIG. 2, the first optical element driving mechanism 200 further includes a driving member 211 which is affixed to the second movable element 209. The driving member 211 has a cylindrical structure and extends along a second axis AX2 (the Z-axis). The second axis AX2 is perpendicular to the first axis AX1, and the second axis AX2 is parallel to the main axis MX.

The first movable element 208 has a first body 2080 and a clamping portion 2082. When viewed along the main axis MX, the clamping portion 2082 has a U-shaped structure. The clamping portion 2082 extends radially from the first body 2080, and the clamping portion 2082 is configured to clamp the driving member 211.

When the second movable element 209 moves along the first axis AX1, the driving member 211 is configured to be in contact with the clamping portion 2082 to drive the first movable element 208 to rotate around the main axis MX, thereby driving the first optical elements OE1 to selectively block the first inner opening 2031.

In this embodiment, the first body 2080 has a plastic material, the clamping portion 2082 has a plastic material and a metal material, and the plastic material covers the metal material. Specifically, the metal material can have a U-shaped structure, and is embedded in the plastic material by insert molding technology.

As shown in FIG. 2, the first frame 204 has an arc opening 2041, and the clamping portion 2082 is exposed from the arc opening 2041. It is worth noting that the angle of the arc opening 2041 is greater than the limit movement angle (the maximum angle of movement) of the first movable element 208.

Next, as shown in FIG. 3, the second optical element driving mechanism 100 includes a second fixed assembly FA2, a second movable assembly MA2 and a second driving assembly DA2. The second movable assembly MA2 is configured to be connected to a second optical element OE2. The second driving assembly DA2 is configured to drive the second movable assembly MA2 and the second optical element OE2 to move relative to the second fixed assembly FA2.

The second fixed assembly FA2 includes a casing 102 and a second base 112. The casing 102 is affixed to the second base 112 to form an accommodation space 1023, and the accommodation space 1023 is configured to accommodate the second movable assembly MA2 and the second driving assembly DA2. Additionally, as shown in FIG. 1, the casing 102 may surround a portion of the first optical element driving mechanism 200.

Furthermore, in this embodiment, the second movable assembly MA2 may include a second frame 104, a holder 108 and an intermediate bracket 105. The holder 108 is configured to hold the second optical element OE2.

As shown in FIG. 3, the aforementioned casing 102 has a hollow structure, and a casing opening 1021 is formed thereon, and a base opening 1121 is formed on the second base 112. The center of the casing opening 1021 corresponds to an optical axis O of the second optical element OE2 held by the holder 108, and the base opening 1121 corresponds to an image sensing element (not shown) disposed under the second base 112.

As shown in FIG. 3, the holder 108 has a hollow annular structure, and has a through hole 1081. The through hole 1081 forms a threaded structure (not shown) corresponding to another threaded structure (not shown) on the second optical element OE2, such that the second optical element OE2 can be locked in the through hole 1081. Furthermore, the second driving assembly DA2 may include two second coils CL2 disposed on the holder 108.

In this embodiment, the second driving assembly DA2 may further include two second magnetic elements MG2 and a third magnetic element MG3. The second frame 104 has a plurality of grooves 1041 and a central opening 1043. In this embodiment, the second frame 104 has three grooves 1041 for accommodating the aforementioned second magnetic elements MG2 and third magnetic element MG3, but the number of grooves 1041 and magnetic elements is not limited to this embodiment. The holder 108 and the aforementioned second optical element OE2 are disposed in the central opening 1043 and can move relative to the second frame 104.

Furthermore, the second driving assembly DA2 may further include a circuit board 116. The circuit board 116 has three third coils CL3 disposed therein. The number of the third coils CL3 is not limited to this embodiment. The second optical element driving mechanism 100 further includes a circuit assembly 120 electrically connected to the second driving assembly DA2. Specifically, the circuit assembly 120 is electrically connected to the circuit board 116 and an external control circuit, and the external control circuit can control the third coils CL3 to be turned on or off. The circuit assembly 120 may be a flexible circuit board, but it is not limited thereto.

In this embodiment, the optical system 10 may further include a first elastic element 106 and a second elastic element 110, and the holder 108 may be connected to the second frame 104 through the first elastic element 106 and the second elastic element 110 to be suspended in the central opening 1043. When the second coils CL2 are energized, the two second magnetic elements MG2 act with the second coils CL2 to generate an electromagnetic driving force, thereby driving the holder 108 to move along the optical axis O (the Z-axis) relative to the second frame 104 to perform the auto focusing function.

As shown in FIG. 3, the second optical element driving mechanism 100 may further include a third rolling assembly RA3. The third rolling assembly RA3 may include seven third rolling elements RE3 (balls). three of the third rolling elements RE3 are disposed between the second frame 104 and the intermediate bracket 105, other three third rolling elements RE3 are disposed between the intermediate bracket 105 and the second base 112, and the last third rolling element RE3 is disposed between the second frame 104 and the second base 112.

Therefore, the second frame 104 can move along a third axis AX3 (the Y-axis) relative to the intermediate bracket 105 by the third rolling assembly RA3, and the intermediate bracket 105 and the second frame 104 can move along the first axis AX1 relative to the second base 112 by the third rolling assembly RA3. The third axis AX3 is perpendicular to the first axis AX1 and the second axis AX2.

When the third coils CL3 are energized and are induced with the corresponding second magnetic elements MG2 and the third magnetic element MG3, an electromagnetic driving force is generated to drive the second frame 104 to drive the holder 108 to move along the Y-axis or along the X-axis. Therefore, when the optical system 10 is shaken, the holder 108 can be driven by the aforementioned electromagnetic driving force to move on the X-Y plane, so as to achieve the purpose of optical image stabilization.

Figure 4:
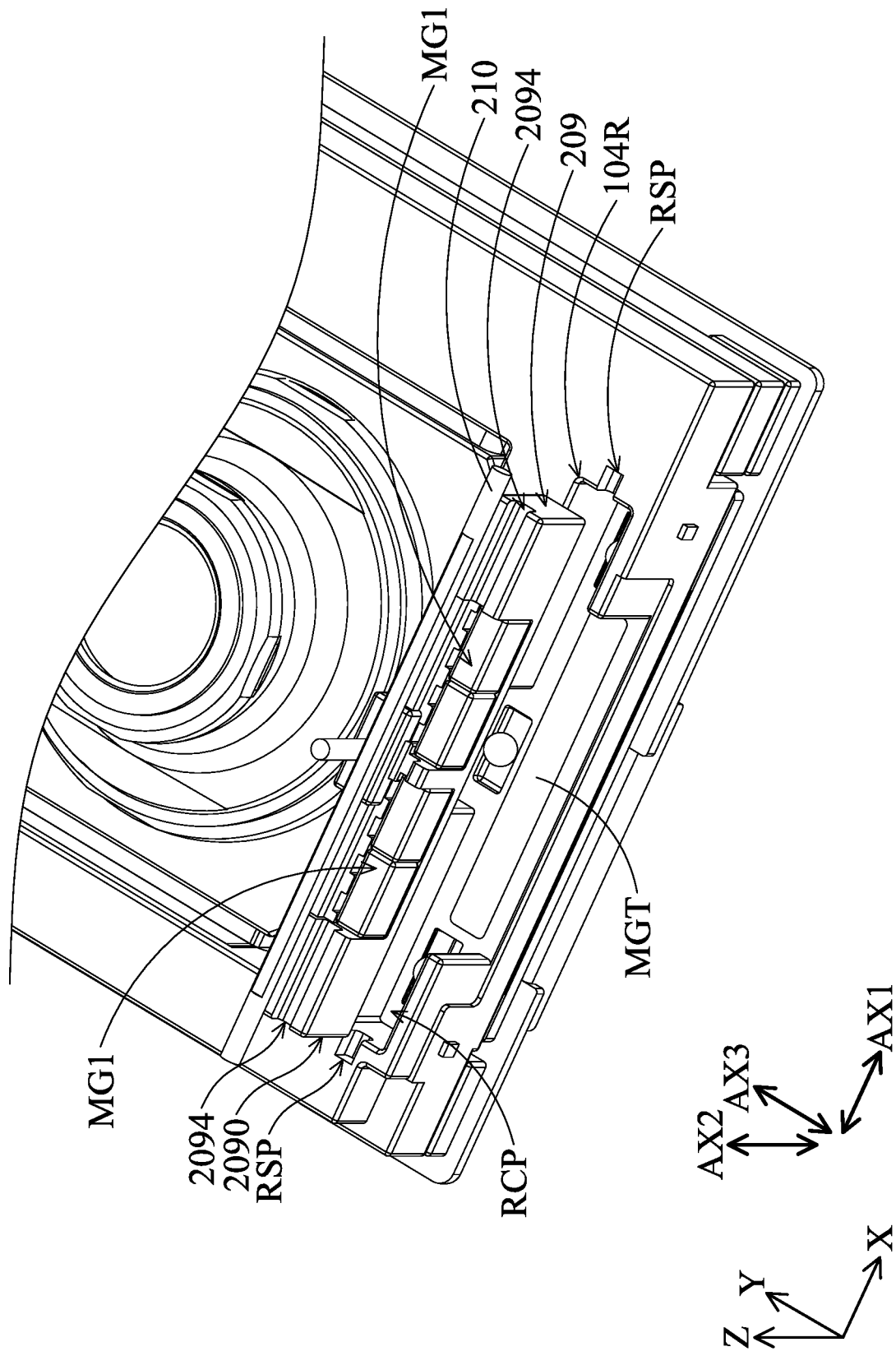
FIG. 4 is a perspective view of a partial structure of the optical system 10 according to an embodiment of the present disclosure.
Figure 5:
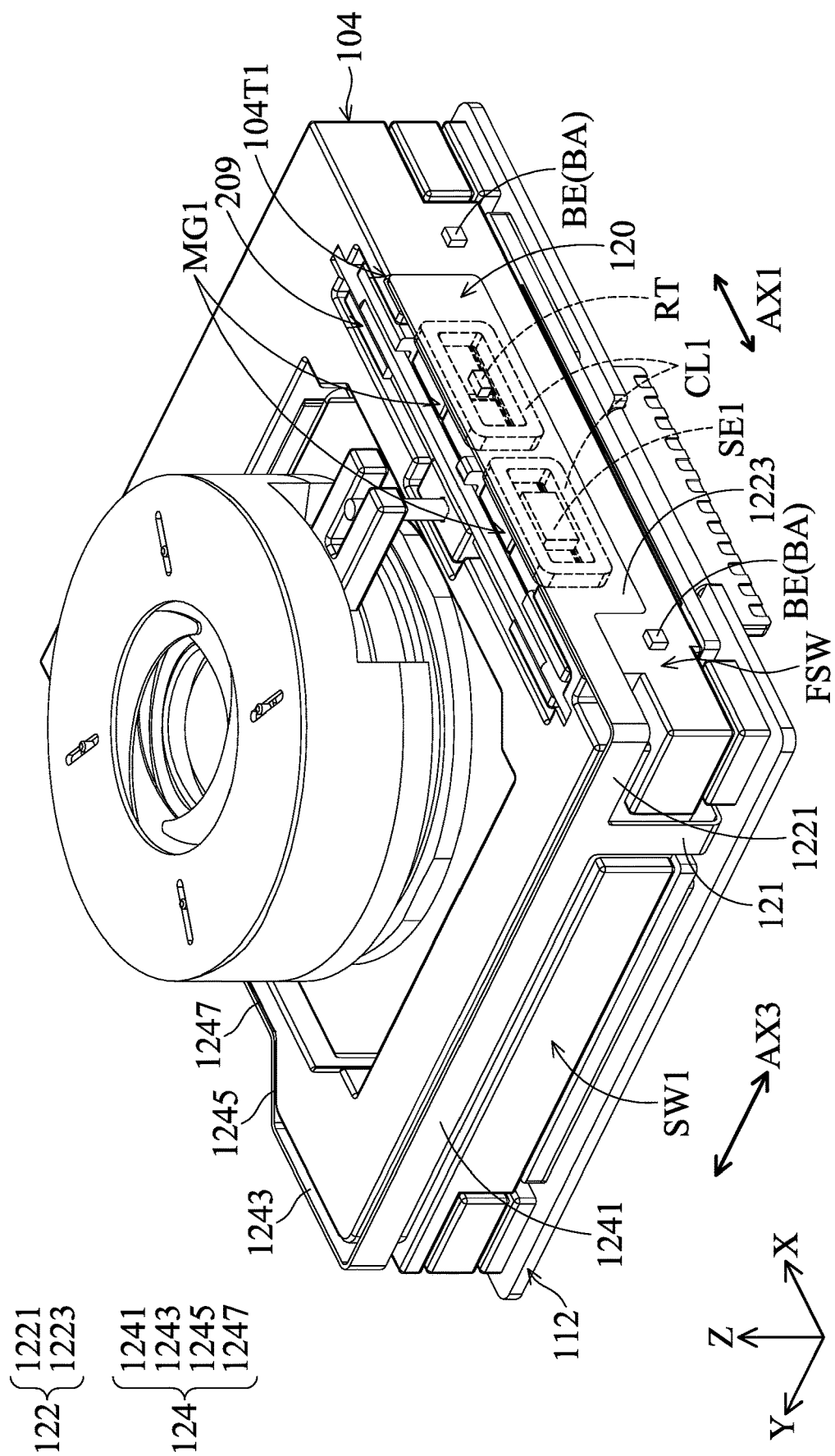
FIG. 5 is a perspective view of the optical system 10 after removing the casing 102 according to an embodiment of the present disclosure.
Figure 6:
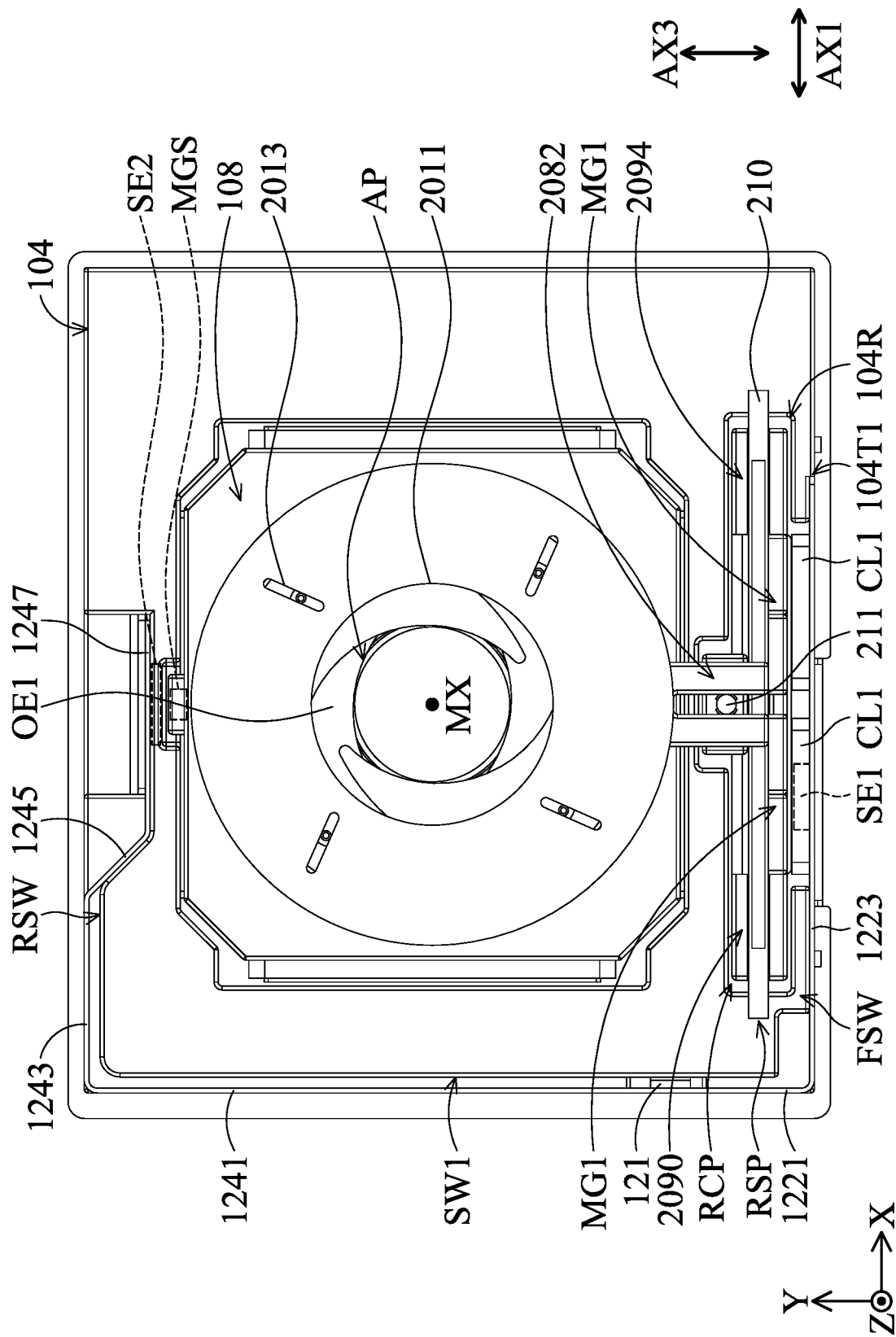
FIG. 6 is a top view of a partial structure of the optical system 10 according to an embodiment of the present disclosure.

Please refer to FIG. 2 to FIG. 6. FIG. 4 is a perspective view of a partial structure of the optical system 10 according to an embodiment of the present disclosure, FIG. 5 is a perspective view of the optical system 10 after removing the casing 102 according to an embodiment of the present disclosure, and FIG. 6 is a top view of a partial structure of the optical system 10 according to an embodiment of the present disclosure.

As shown in FIG. 4, the first driving assembly DA1 includes two first magnetic elements MG1 fixedly disposed on the second movable element 209, and the two first magnetic elements MG1 are arranged along the first axis AX1. In this embodiment, the first magnetic elements MG1, the second magnetic elements MG2 and the third magnetic element MG3 can be magnets, but they are not limited thereto.

The second optical element driving mechanism 100 may further include a magnetic member MGT disposed in the receiving trench 104R. In the second axis AX2, a portion of the second movable element 209 is located between the two first magnetic elements MG1 and the magnetic member MGT. A magnetic attraction force is generated between the two first magnetic elements MG1 and the magnetic member MGT, so that the second movable element 209 is not separated from the receiving trench 104R.

The first driving assembly DA1 further includes two first coils CL1 corresponding to the two first magnetic elements MG1 respectively. The two first coils CL1 are fixedly disposed on the circuit assembly 120 and electrically connected to the circuit assembly 120, and the two first coils CL1 are arranged along the first axis AX1. When the two first coils CL1 are energized, the two first coils CL1 can act with the first magnetic elements MG1 to generate an electromagnetic driving force to drive the second movable element 209 to move along the first axis AX1.

Figure 7:
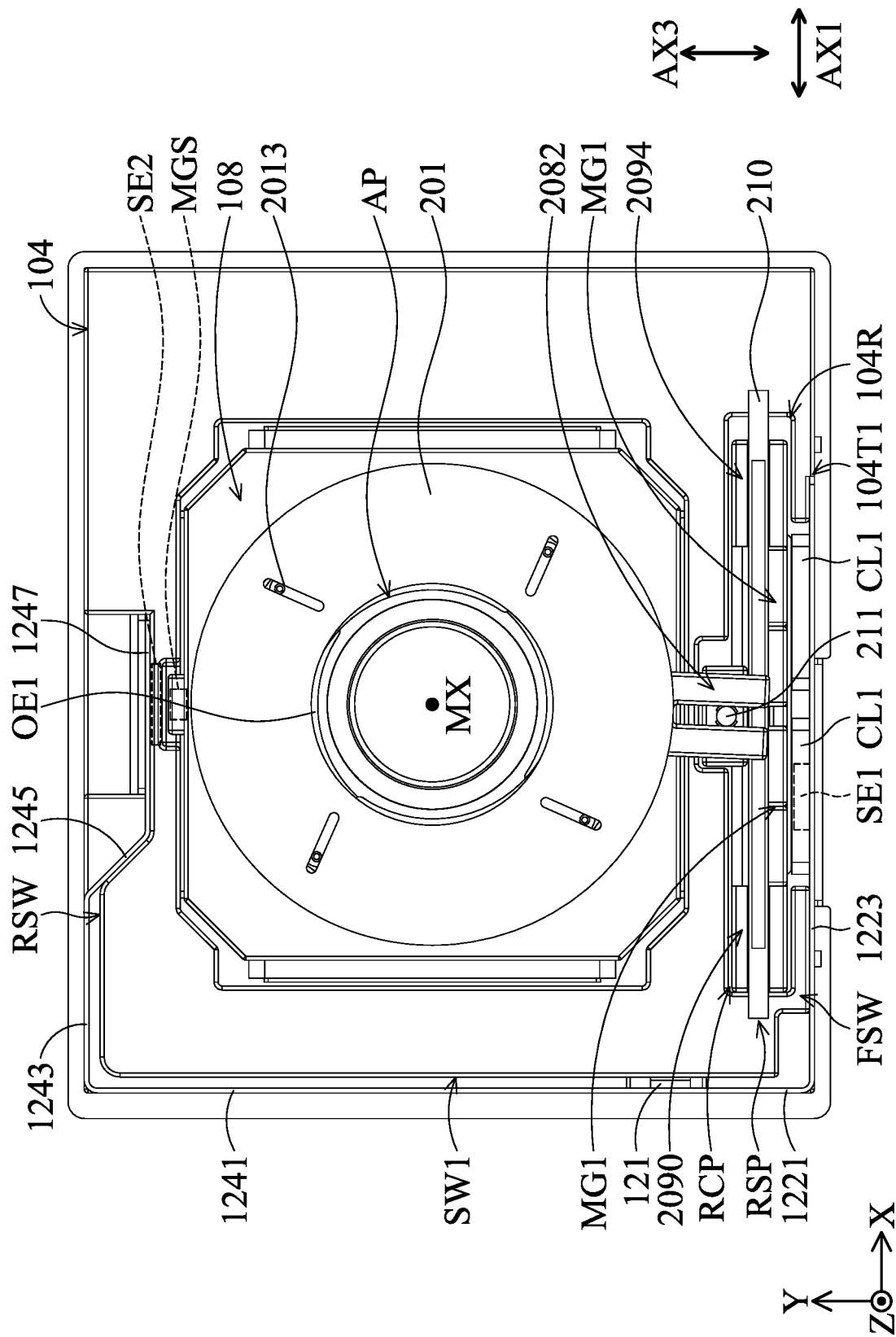
FIG. 7 is a top view of the second movable element 209 in a first extreme position according to an embodiment of the present disclosure.
Figure 8:
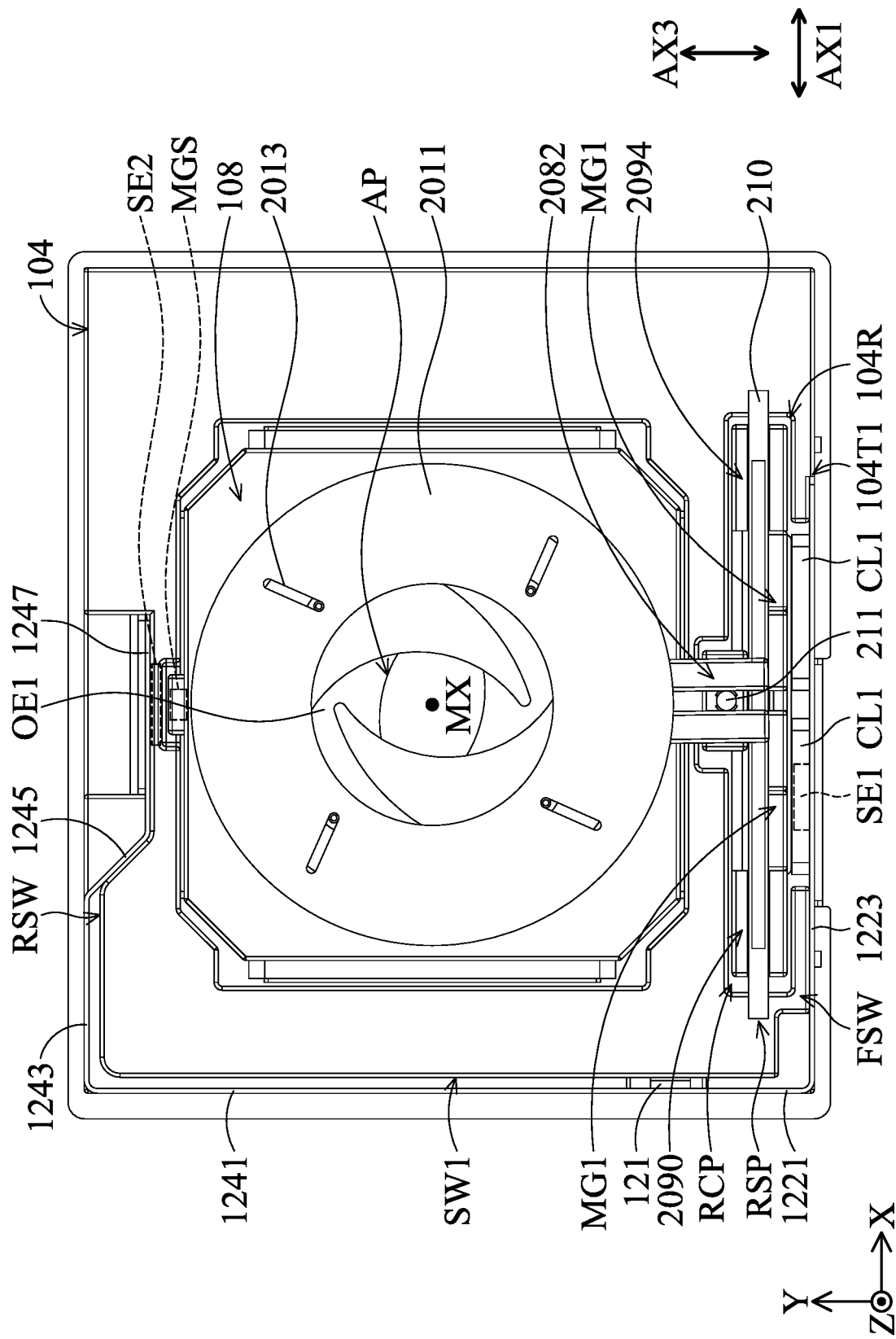
FIG. 8 is a top view of the second movable element 209 in a second extreme position according to an embodiment of the present disclosure.

For example, please refer to FIG. 6 to FIG. 8. FIG. 7 is a top view of the second movable element 209 in a first extreme position according to an embodiment of the present disclosure, and FIG. 8 is a top view of the second movable element 209 in a second extreme position according to an embodiment of the present disclosure. When the two first coils CL1 are energized, the second movable element 209 can be driven to move between the first extreme position and the second extreme position, thereby driving the first optical elements OE1 (the blades) to move, so as to change the amount of light entering the first optical element driving mechanism 200.

For example, as shown in FIG. 7, when the second movable element 209 is in the first extreme position, the first optical elements OE1 are accommodated under the outer shielding member 201, so that the aperture AP of first optical element driving mechanism 200 has the largest size (in some embodiments, the size of the aperture AP may be equal to the size of the first inner opening 2031 at this time). Then, when it is desired to adjust the size of the aperture AP, the second movable element 209 can be driven to move from the first extreme position in FIG. 7 to the position in FIG. 6, so that the four first optical elements OE1 begin to shield the first outer opening 2011, and therefore the aperture AP is gradually narrowed.

Furthermore, as shown in FIG. 8, when the second movable element 209 moves from the position in FIG. 6 to the second extreme position in FIG. 8, the four first optical elements OE1 continue to shield the first outer opening 2011, so that the aperture AP gradually shrinks to a minimum size. Based on the above structural configuration, the size of the aperture AP of the first optical element driving mechanism 200 can be continuously changed, so that the image captured by the optical system 10 can be clearer.

As shown in FIG. 4 and FIG. 6, the second movable element 209 has a second body 2090, and the second body 2090 has a long strip-shaped structure extending along the first axis AX1. When viewed along the main axis MX, the length of the receiving trench 104R in the first axis AX1 is greater than the length of the second body 2090 in the first axis AX1.

The receiving trench 104R has a middle receiving portion RCP and two side receiving portions RSP. The two side receiving portions RSP extend from the middle receiving portion RCP along the first axis AX1. The middle receiving portion RCP is configured to accommodate the second body 2090. Furthermore, the first optical element driving mechanism 200 may further include a blocking member 210 having a long strip-shaped structure extending along the first axis AX1. For example, the blocking member 210 is a cylinder, but it is not limited thereto.

The blocking member 210 is fixedly disposed in the two side receiving portions RSP. For example, the blocking member 210 can be fixed in the two side receiving portions RSP by glue. Furthermore, as shown in FIG. 4, the second movable element 209 further includes two receiving structures 2094 disposed on opposite sides of the second body 2090.

It should be noted that the blocking member 210 is suspended in the two receiving structures 2094. That is, the blocking member 210 is not in contact with the receiving structures 2094, and the blocking member 210 is not in contact with the second body 2090. When the optical system 10 is impacted, the blocking member 210 may be in contact with the second movable element 209 to prevent the second movable element 209 from detaching from the receiving trench 104R.

Figure 9:
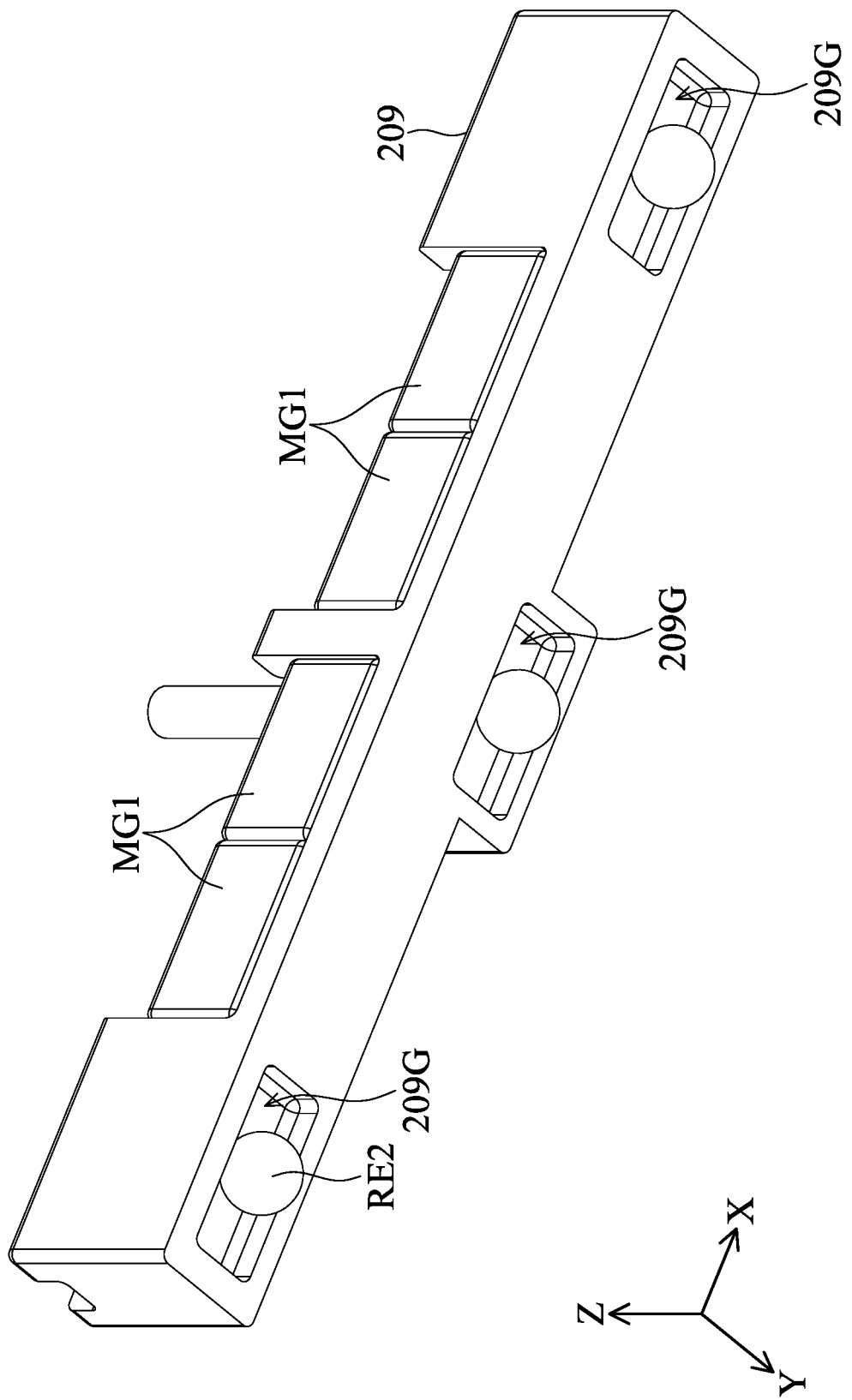
FIG. 9 is a perspective view of the second movable element 209 and the first magnetic elements MG1 according to an embodiment of the present disclosure.
Figure 10:
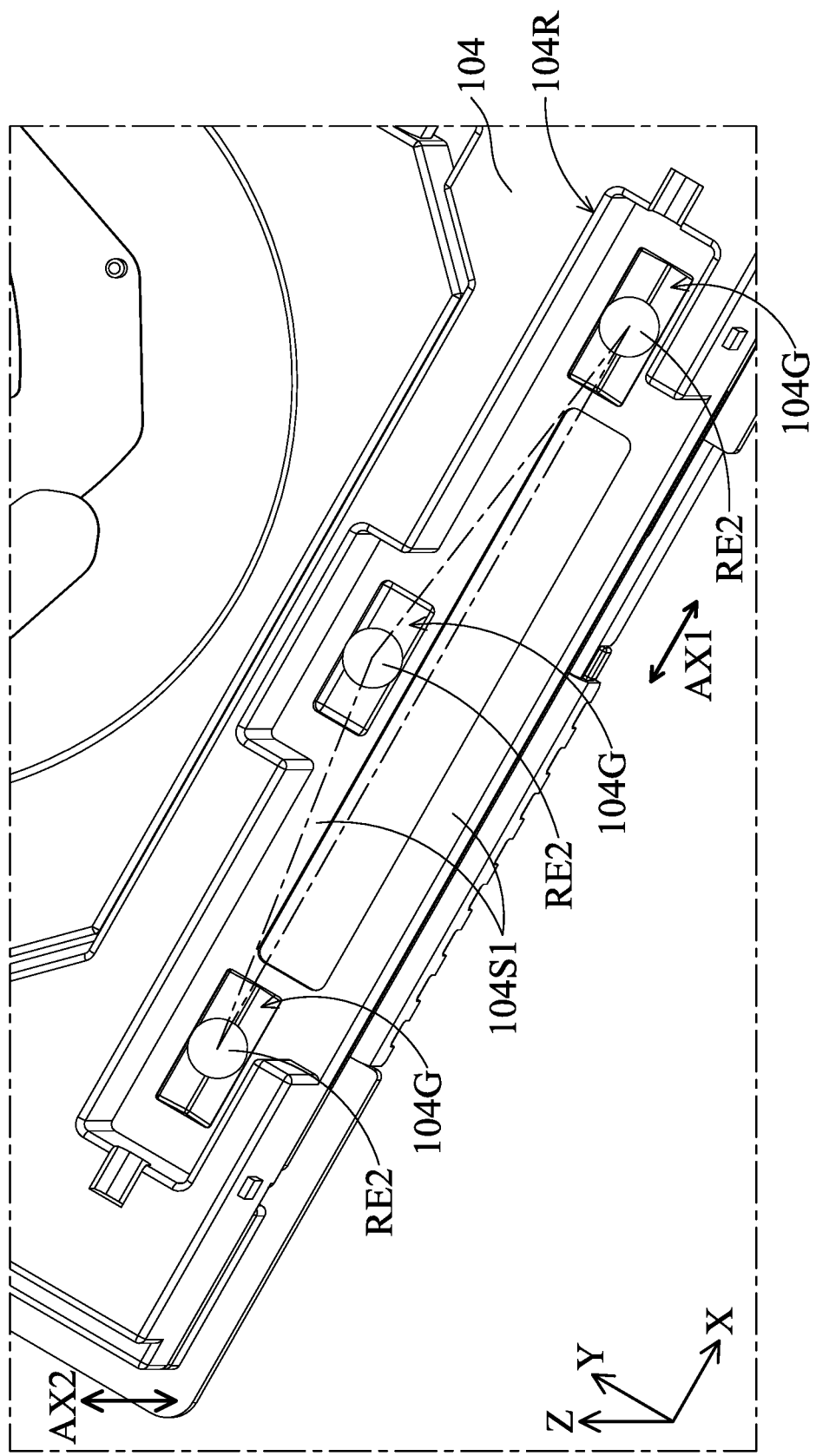
FIG. 10 is an enlarged diagram of the second frame 104 according to an embodiment of the present disclosure.

Please refer to FIG. 9 and FIG. 10. FIG. 9 is a perspective view of the second movable element 209 and the first magnetic elements MG1 according to an embodiment of the present disclosure, and FIG. 10 is an enlarged diagram of the second frame 104 according to an embodiment of the present disclosure. In this embodiment, the second frame 104 of the second movable assembly MA2 further includes at least three receiving grooves 104G extending along the first axis AX1, and the second movable element 209 correspondingly includes at least three receiving grooves 209G.

The first optical element driving mechanism 200 further includes a second rolling assembly RA2 disposed between the second movable element 209 and the second frame 104 of the second movable assembly MA2. Specifically, the second rolling assembly RA2 includes at least three second rolling elements RE2, which are respectively disposed in the at least three receiving grooves 104G and the at least three receiving grooves 209G. Therefore, the second movable element 209 can move along the first axis AX1 with respect to the second frame 104 of the second movable assembly MA2 by the second rolling elements RE2.

As shown in FIG. 10, when viewed along the main axis MX (the second axis AX2), the second rolling elements RE2 may form a triangle, and the triangle is an isosceles triangle, but it is not limited thereto. Furthermore, the receiving grooves 104G are concaved from a receiving surface 104S1 in the receiving trench 104R, and the receiving grooves 104G are communicated with the receiving trench 104R.

Please return to FIG. 5. As shown in FIG. 5, the first optical element driving mechanism 200 further includes a first position sensing element SE1 and an electronic element RT, which are disposed on the circuit assembly 120. One of the two first coils CL1 surrounds the first position sensing element SE1, and the other of the two first coils CL1 surrounds the electronic element RT. The first position sensing element SE1 can be, for example, a Hall sensor, and the electronic element RT can be, for example, a capacitor, but they are not limited thereto.

The first position sensing element SE1 is configured to sense the change of the magnetic field of the first magnetic element MG1 to obtain the position of the second movable element 209. It is worth noting that the first position sensing element SE1 only corresponds to one of the two first magnetic elements MG1. For example, when the second movable element 209 moves and when viewed along the third axis AX3, the first position sensing element SE1 only overlaps one of the two first magnetic elements MG1 and does not overlap the other one of the two first magnetic elements MG1.

Figure 11:
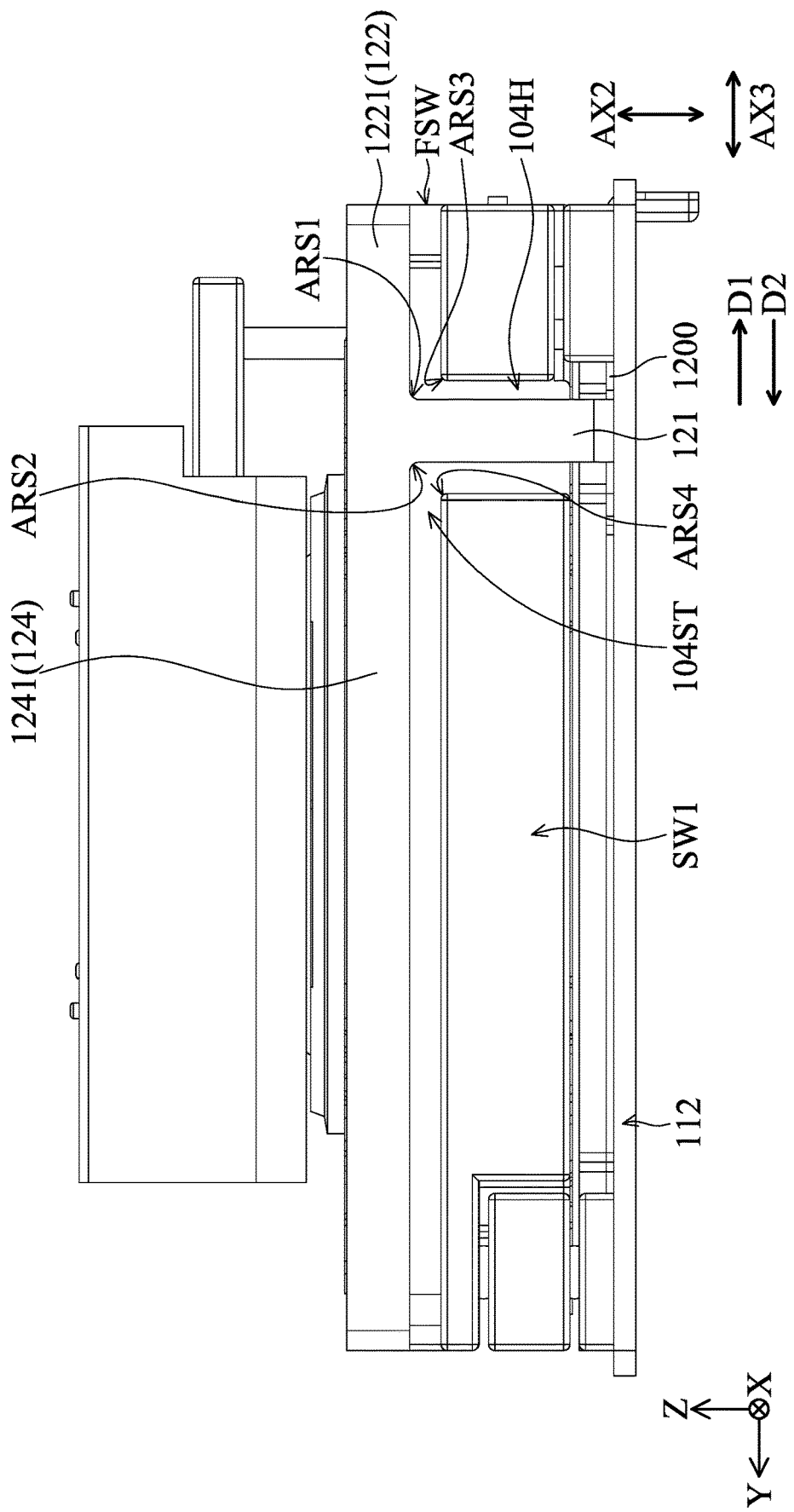
FIG. 11 is a side view of the optical system 10 after removing the casing 102 according to an embodiment of the present disclosure.
Figure 12:
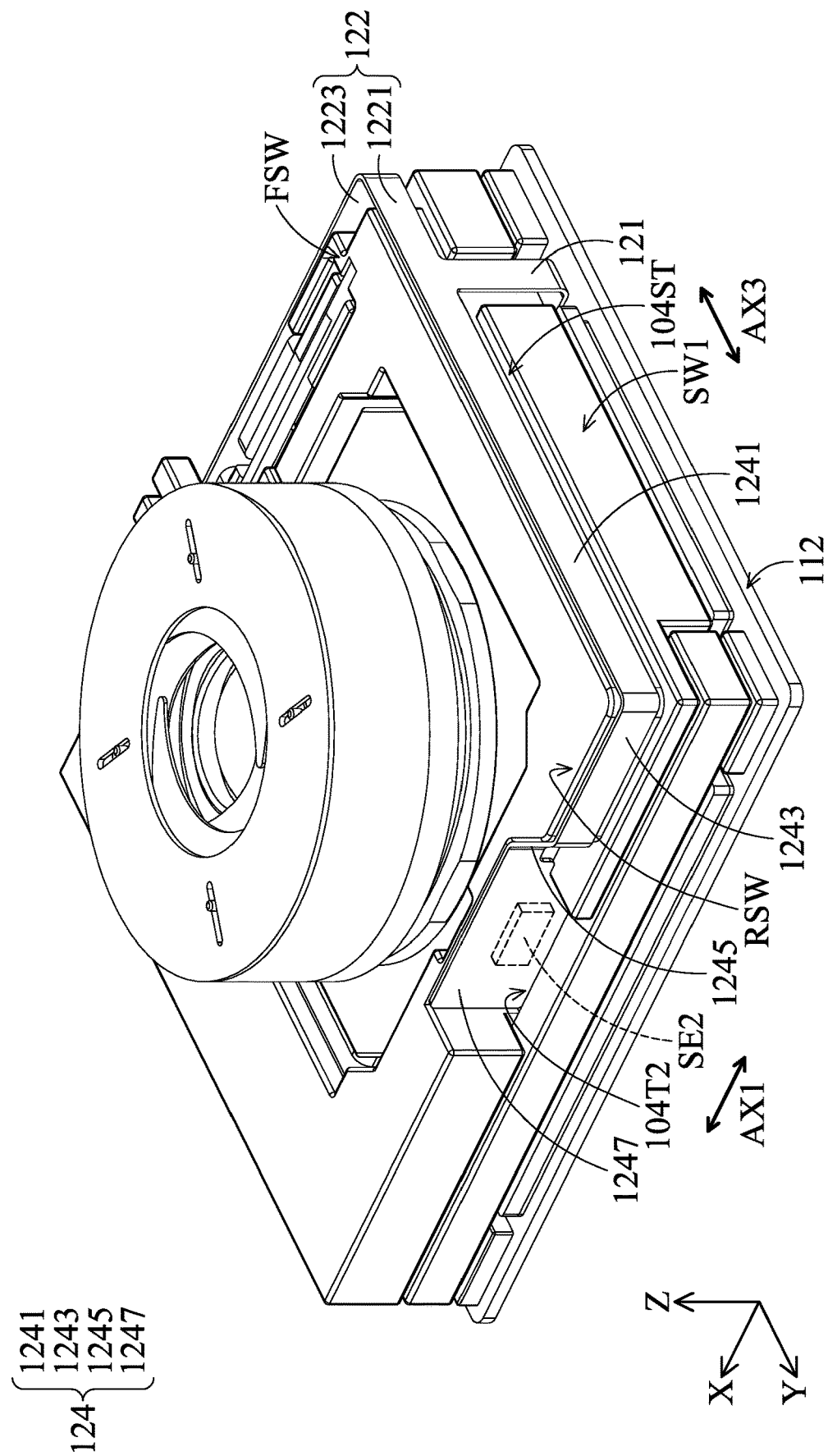
FIG. 12 is a schematic diagram of the optical system 10 after removing the casing 102 according to an embodiment of the present disclosure.

Please refer to FIG. 5, FIG. 11 and FIG. 12. FIG. 11 is a side view of the optical system 10 after removing the casing 102 according to an embodiment of the present disclosure, and FIG. 12 is a schematic diagram of the optical system 10 after removing the casing 102 according to an embodiment of the present disclosure. In this embodiment, the circuit assembly 120 includes a substrate 1200, a sharing element 121, a first circuit element 122 and a second circuit element 124. It should be noted that the sharing element 121, the first circuit element 122 and the second circuit element 124 are integrated formed as one piece.

The substrate 1200 is disposed on the second base 112, the sharing element 121, the first circuit element 122 and the second circuit element 124 each has a long-shaped structure, and the sharing element 121 extends along the second axis AX2 from the substrate 1200. The first circuit element 122 is configured to be electrically connected to the first driving assembly DA1 and the first position sensing element SE1. Specifically, the first circuit element 122 is electrically connected to the two first coils CL1.

As shown in FIG. 11, when viewed along first axis AX1, the first circuit element 122 extends in a first direction D1 from the sharing element 121. Moreover, as shown in FIG. 11 and FIG. 12, the second circuit element 124 is configured to be electrically connected to the second position sensing element SE2. When viewed along the first axis AX1, the second circuit element 124 extends in a second direction D2 from the sharing element 121. The first direction D1 is opposite to the second direction D2.

In this embodiment, a first side wall SW1 of the second frame 104 forms a side groove 104ST configured to accommodate a portion of the circuit assembly 120. As shown in FIG. 10, when viewed along the first axis AX1, the side groove 104ST has a T-shaped structure. When viewed along the first axis AX1, the sharing element 121, the first circuit element 122 and the second circuit element 124 forms a T-shaped structure, corresponding the side groove 104ST.

The first circuit element 122 and the sharing element 121 form a first arc structure ARS1, and the second circuit element 124 and the sharing element 121 form a second arc structure ARS2. In addition, the first side wall SW1 forms a third arc structure ARS3 and a fourth arc structure ARS4, respectively corresponding to the first arc structure ARS1 and second arc structure ARS2.

The radius of curvature of the first arc structure ARS1 is different from the radius of curvature of the third arc structure ARS3. Specifically, the radius of curvature of the first arc structure ARS1 is greater than the radius of curvature of the third arc structure ARS3. The radius of curvature of the second arc structure ARS2 is different from the radius of curvature of the fourth arc structure ARS4. Specifically, the radius of curvature of the second arc structure ARS2 is greater than the radius of curvature of the fourth arc structure ARS4. In addition, in this embodiment, the radius of curvature of the first arc structure ARS1 may be equal to the radius of curvature of the second arc structure ARS2, but it is not limited thereto.

When viewed along the first axis AX1, a handle portion 104H of the side groove 104ST extends along the second axis AX2. When viewed along the first axis AX1, the width of the handle portion 104H in the third axis AX3 is greater than the width of the sharing element 121 in the third axis AX3.

It is worth noting that, as shown in FIG. 6, when viewed along the second axis AX2, the sharing element 121, the first circuit element 122 and the second circuit element 124 are not in contact with the first side wall SW1. Based on the above structural design, it is ensured that there is enough space for the circuit assembly 120 to move with the second frame 104.

In this embodiment, the first circuit element 122 includes a first extending portion 1221 and a first contact portion 1223. The first extending portion 1221 is connected to the first contact portion 1223, and the first extending portion 1221 and the first contact portion 1223 extend in different directions. For example, the first extending portion 1221 extends along the third axis AX3, and the first contact portion 1223 extends along the first axis AX1.

The first extending portion 1221 is not in contact with the first side wall SW1, and the first contact portion 1223 is in contact with a front side wall FSW of the second frame 104. The front side wall FSW forms a first slot 104T1, and a portion of the first contact portion 1223 is inserted into the first slot 104T1.

That is, the first contact portion 1223 is affixed to the second frame 104. Therefore, the distance between the first coil CL1 and the first magnetic element MG1 in the third axis AX3 is fixed (FIG. 6), so that it is ensured that the electromagnetic driving force generated by the first driving assembly DA1 remains fixed, so that the second movable element 209 can move stably along the first axis AX1.

Similarly, the distance between the first position sensing element SE1 and the corresponding first magnetic element MG1 in the third axis AX3 can be also fixed, so that the sensing accuracy of the first position sensing element SE1 can be increased.

Furthermore, the second circuit element 124 includes a second extending portion 1241, a third extending portion 1243, a curved portion 1245, and a second contact portion 1247. The second extending portion 1241 is connected to the third extending portion 1243, and the second extending portion 1241 extends in a different direction than the third extending portion 1243. For example, the second extending portion 1241 extends along the third axis AX3, and the third extending portion 1243 extends along the first axis AX1.

The curved portion 1245 is connected between the second contact portion 1247 and the third extending portion 1243, and the curved portion 1245 extends in a different direction than the second contact portion 1247 and the third extending portion 1243. As shown in FIG. 6, the second extending portion 1241 is not in contact with the first side wall SW1, the third extending portion 1243 is not in contact with a rear side wall RSW of the second frame 104, and a portion of the curved portion 1245 is not in contact with the rear side wall RSW.

The second contact portion 1247 is in contact with the rear side wall RSW. Specifically, a second slot 104T2 is formed on the rear side wall RSW, and a portion of the second contact portion 1247 is inserted into the second slot 104T2. Based on the design of the first slot 104T1 and the second slot 104T2, it can increase the convenience and accuracy of assembly when installing the circuit assembly 120 to the second frame 104.

As shown in FIG. 6, when viewed along the main axis MX, the shortest distance between the first contact portion 1223 and the main axis MX is different from the shortest distance between the second contact portion 1247 and the main axis MX. When viewed along the main axis MX, the shortest distance between the first contact portion 1223 and the main axis MX is greater than the shortest distance between the second contact portion 1247 and the main axis MX.

The second position sensing element SE2 is disposed on the second contact portion 1247. When viewed along the main axis MX, the second position sensing element SE2 overlaps the second frame 104. A sensing magnet MGS corresponding to the second position sensing element SE2 is disposed on the holder 108. The second position sensing element SE2 is configured to sense changes of the magnetic field of the sensing magnet MGS to obtain the position of the holder 108 relative to the second frame 104.

As shown in FIG. 6, when viewed along the main axis MX, the distance between the sensing magnet MGS and the second contact portion 1247 in the third axis AX3 is less than the distance between the sensing magnet MGS and the third extending portion 1243 in the third axis AX3. Based on the above structural configuration, the sensing accuracy of the second position sensing element SE2 can be increased.

Figure 13:
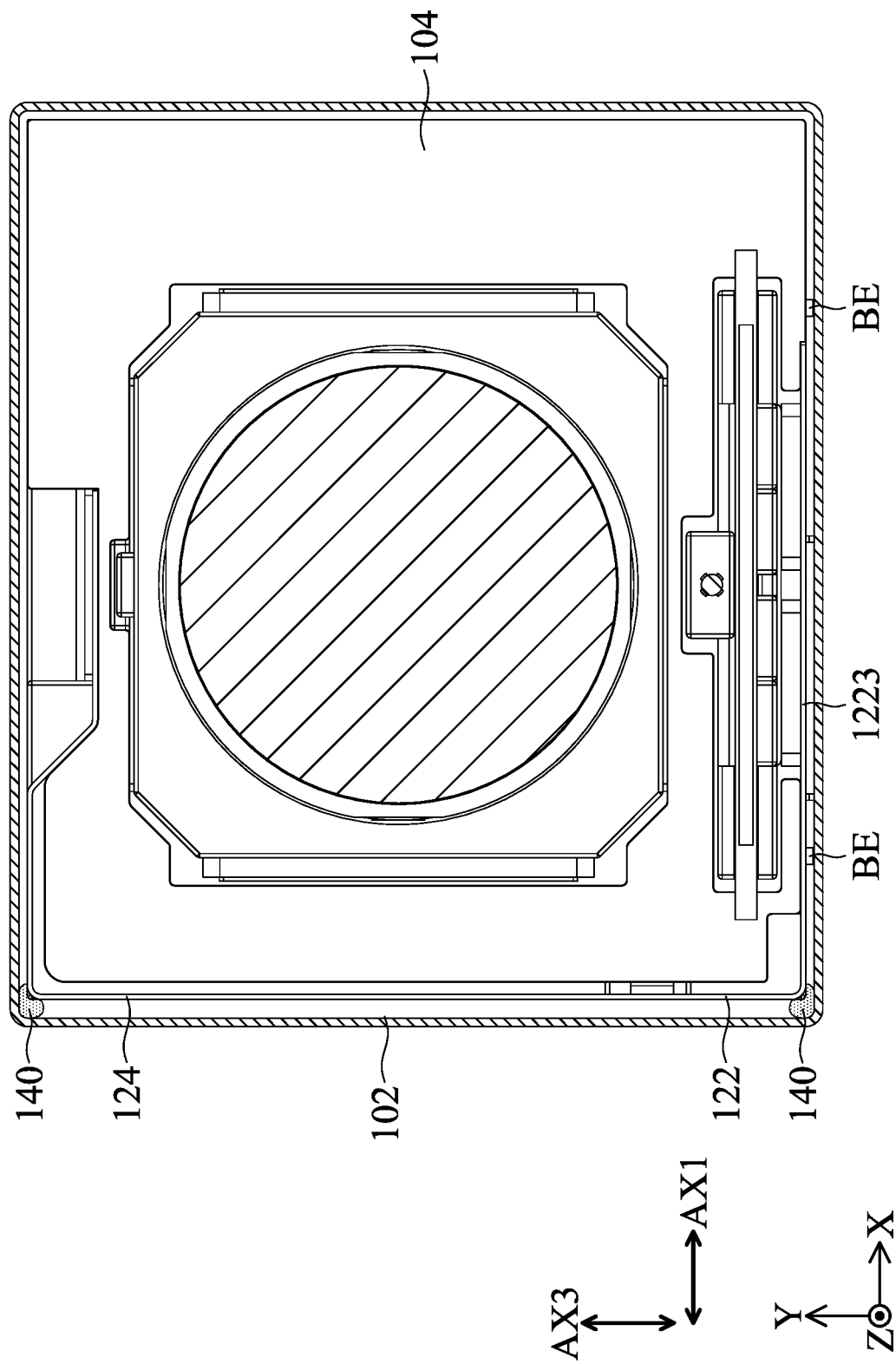
FIG. 13 is a cross-sectional view of the optical system 10 along the line A-A in FIG. 1 according to an embodiment of the present disclosure.

Please refer to FIG. 5 and FIG. 13. FIG. 13 is a cross-sectional view of the optical system 10 along the line A-A in FIG. 1 according to an embodiment of the present disclosure. The second optical element driving mechanism 100 further includes a blocking assembly BA disposed on the front side wall FSW. The blocking assembly BA is configured to be in contact with the casing 102 when the second frame 104 moves along the third axis AX3 with respect to the second base 112. In this embodiment, the blocking assembly BA includes two blocking elements BE protruding from the front side wall FSW along the third axis AX3.

It should be noted that the number and location of the blocking element BE are not limited to this embodiment. Based on the design of the blocking elements BE, it is ensured that the first contact portion 1223 of the circuit assembly 120 is not damaged by collision when the second frame 104 moves along the third axis AX3.

Furthermore, in some embodiments, the second optical element driving mechanism 100 may further include two buffering elements 140. As shown in FIG. 13, one of the two buffering elements 140 may be disposed between the first circuit element 122 and the casing 102, and the other of the two buffering elements 140 may be disposed between the second circuit element 124 and the casing 102. In this embodiment, the buffering element 140 may be a gel, but it is not limited thereto.

Based on the design of the buffering element 140, the second frame 104 can be more stable when moving, and it can also ensure that the circuit assembly 120 does not collide with the casing 102 and causes damage when the second frame 104 moves. In addition, in other embodiments, the second optical element driving mechanism 100 may include other buffering elements 140 disposed between the circuit assembly 120 and the second frame 104.

Figure 14:
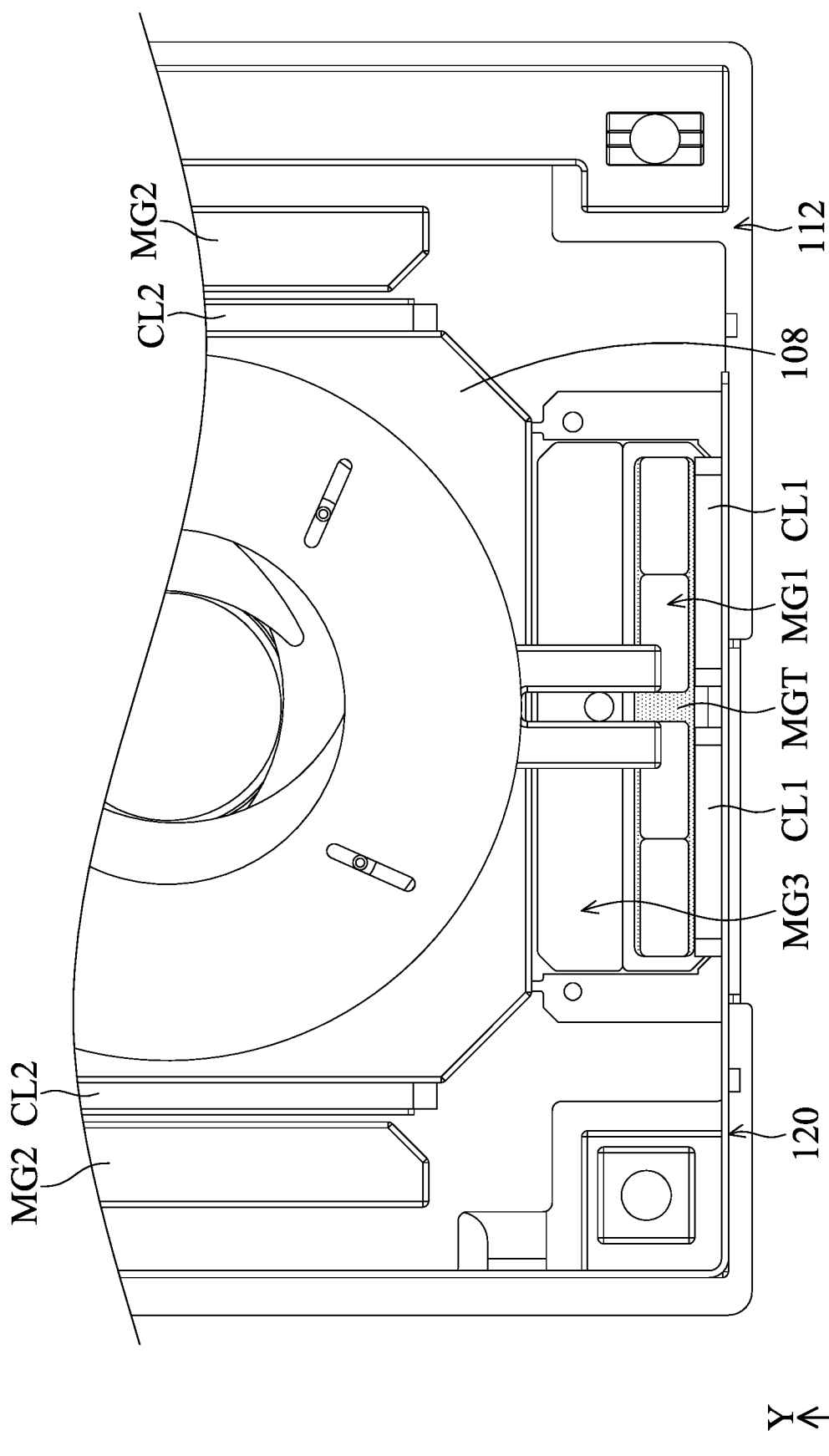
FIG. 14 is a top view of a partial structure of the optical system 10 according to an embodiment of the present disclosure.

Please refer to FIG. 6 and FIG. 14. FIG. 14 is a top view of a partial structure of the optical system 10 according to an embodiment of the present disclosure. As shown in FIG. 14, when viewed along the second axis AX2 (the Z-axis), the two first magnetic elements MG1 overlap the magnetic member MGT. When viewed along the second axis AX2, the area of the magnetic member MGT is larger than the total area of the two first magnetic elements MG1.

Specifically, the magnetic member MGT is disposed between the first magnetic elements MG1 and the third magnetic element MG3, and the magnetic member MGT is made of magnetic material. Based on the above structural configuration, the problem of magnetic interference between the first magnetic elements MG1 and the third magnetic element MG3 can be effectively reduced.

Furthermore, as shown in FIG. 6, when viewed along the second axis AX2, the blocking member 210 overlaps the two first magnetic elements MG1. When viewed along the second axis AX2, the blocking member 210 does not overlap the driving member 211. When viewed along the second axis AX2, the clamping portion 2082 overlaps a portion of the blocking member 210. When viewed along the second axis AX2, the length of the blocking member 210 in the first axis AX1 is greater than the length of the second body 2090 in the first axis AX1.

In conclusion, the present disclosure provides an optical system 10 including a first optical element driving mechanism 200 and a second optical element driving mechanism 100. The first optical element driving mechanism 200 may serve as an aperture mechanism, configured to adjust the amount of light entering the optical system 10. The second optical element driving mechanism 100 can achieve the functions of auto-focusing (AF) and optical image stabilization (OIS).

In some embodiments, when the second movable element 209 is driven to move along the first axis AX1, the driving member 211 is configured to be in contact with the clamping portion 2082 to drive the first movable element 208 to rotate around the main axis MX, thereby drive the first optical elements OE1 to adjust the size of the aperture. It is worth noting that, the second movable element 209 is disposed in the second frame 104 of the second optical element driving mechanism 100, so the purpose of miniaturization can be achieved. Furthermore, based on the configurations of the second movable element 209, the driving member 211 and the first movable element 208, the size of the aperture of the first optical element driving mechanism 200 can be continuously changed.

In addition, the first contact portion 1223 of the circuit assembly 120 is affixed to the second frame 104, and the first position sensing element SE1 is disposed on the first contact portion 1223. Therefore, when the second frame 104 moves relative to the second base 112, the distance between the first position sensing element SE1 and the corresponding first magnetic element MG1 in the third axis AX3 remains fixed, so that the sensing accuracy of the first position sensing element SE1 can be increased.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a first optical element driving mechanism, comprising:
a first fixed assembly;
a first movable assembly, configured to be connected to a first optical element, wherein the first movable assembly is movable relative to the first fixed assembly, and the first movable assembly comprises a first movable element and a second movable element; and
a first driving assembly, configured to drive the first movable assembly to move relative to the first fixed assembly;
wherein the first fixed assembly and the first movable assembly are arranged along a main axis, and the first driving assembly is configured to drive the second movable element to move along a first axis, thereby driving the first movable element to move around the main axis;
wherein the optical system further comprises a second optical element driving mechanism;
the first optical element driving mechanism is disposed on the second optical element driving mechanism;
the second optical element driving mechanism comprises a second driving assembly;
the second optical element driving mechanism further comprises a circuit assembly electrically connected to the first driving assembly and the second driving assembly;
the circuit assembly comprises a substrate, a sharing element, a first circuit element and a second circuit element;
the sharing element, the first circuit element and the second circuit element each has a long strip-shaped structure;
the sharing element bends from the substrate to extend along a second axis;
the second axis is perpendicular to the first axis;
the second axis is parallel to the main axis;
when viewed along the first axis, the first circuit element straightly extends in a first direction from the sharing element without bending;
when viewed along the first axis, the second circuit element straightly extends in a second direction from the sharing element without bending;
the first direction is the opposite of the second direction.

2. The optical system as claimed in claim 1, wherein the second optical element driving mechanism further comprises:
a second fixed assembly;
a second movable assembly, configured to be connected to a second optical element; and
the second driving assembly, configured to drive the second movable assembly and the second optical element to move relative to the second fixed assembly;

the second fixed assembly comprises:
a casing; and
a second base;
the casing is affixed to the second base to form an accommodation space;
the accommodation space is configured to accommodate the second movable assembly and the second driving assembly;
the casing surrounds a portion of the first optical element driving mechanism.

3. The optical system as claimed in claim 2, wherein the sharing element, the first circuit element and the second circuit element are integrally formed as one piece;
the substrate is disposed on the second base.

4. The optical system as claimed in claim 3, wherein the first circuit element is configured to be electrically connected to the first driving assembly;
the second circuit element is configured to be electrically connected to a second position sensing element.

5. The optical system as claimed in claim 4, wherein the second movable assembly comprises a second frame which is movable relative to the second base;
a side groove is formed on a first side wall of the second frame and is configured to accommodate a portion of the circuit assembly;
when viewed along the first axis, the side groove has a T-shaped structure;
when viewed along the first axis, the sharing element, the first circuit element and the second circuit element form a T-shaped structure, corresponding to the side groove.

6. The optical system as claimed in claim 5, wherein the first circuit element and the sharing element form a first arc structure;
the second circuit element and the sharing element form a second arc structure;
the first side wall forms a third arc structure and a fourth arc structure, respectively corresponding to the first arc structure and the second arc structure;
a radius of curvature of the first arc structure is different from a radius of curvature of the third arc structure;
the radius of curvature of the first arc structure is greater than the radius of curvature of the third arc structure.

7. The optical system as claimed in claim 6, wherein a radius of curvature of the second arc structure is different from a radius of curvature of the fourth arc structure;
the radius of curvature of the second arc structure is greater than the radius of curvature of the fourth arc structure.

8. The optical system as claimed in claim 7, wherein when viewed along the first axis, a handle portion of the side groove extends along the second axis;
when viewed along the first axis, a width of the handle portion in a third axis is greater than a width of the sharing element in the third axis;
the third axis is perpendicular to the first axis and the second axis;
when viewed along the second axis, the sharing element, the first circuit element and the second circuit element are not in contact with the first side wall.

9. The optical system as claimed in claim 8, wherein the first circuit element comprises a first extending portion and a first contact portion;
the first extending portion is connected to the first contact portion;

the first extending portion and the first contact portion extend in different directions;
the first extending portion is not in contact with the first side wall;
the first contact portion is in contact with a front side wall of the second frame;
a first slot is formed on the front side wall, and a portion of the first contact portion is inserted into the first slot;
the first contact portion is affixed to the second frame.

10. The optical system as claimed in claim 9, wherein
the second circuit element comprises a second extending portion, a third extending portion, a curved portion and a second contact portion;
the second extending portion is connected to the third extending portion;
the second extending portion extends in a different direction than the third extending portion;
the curved portion is connected between the second contact portion and the third extending portion;
the curved portion extends in a different direction than the second contact portion and the third extending portion.

11. The optical system as claimed in claim 10, wherein
the second extending portion is not in contact with the first side wall;
the third extending portion is not in contact with a rear side wall of the second frame;
a portion of the curved portion is not in contact with the rear side wall;
the second contact portion is in contact with the rear side wall.

12. The optical system as claimed in claim 11, wherein
a second slot is formed on the rear side wall, and a portion of the second contact portion is inserted into the second slot;
when viewed along the main axis, a shortest distance between the first contact portion and the main axis is different from a shortest distance between the second contact portion and the main axis;
when viewed along the main axis, the shortest distance between the first contact portion and the main axis is greater than the shortest distance between the second contact portion and the main axis;
the second position sensing element is disposed on the second contact portion;
a sensing magnet corresponding to the second position sensing element is disposed on the holder;
when viewed along the main axis, a distance between the sensing magnet and the second contact portion in the third axis is less than a distance between the sensing magnet and the third extending portion in the third axis.

13. The optical system as claimed in claim 12, wherein
the second optical element driving mechanism further comprises a blocking assembly disposed on the front side wall;
when the second frame moves relative to the second base along the third axis, the blocking assembly is configured to be in contact with the casing;
the blocking assembly comprises at least one blocking element protruding from the front side wall along the third axis;
the second optical element driving mechanism further comprises two buffering elements;
one of the two buffering elements is disposed between the first circuit element and the casing;
the other of the two buffering elements is disposed between the second circuit element and the casing;
the buffering element comprises a gel.

14. The optical system as claimed in claim 13, wherein
the second frame has a receiving trench extending along the first axis;
the second movable element is disposed in the receiving trench;
the second movable element is configured to move along the first axis within the receiving trench;
the first optical element driving mechanism further comprises a driving member which is affixed to the second movable element;
the driving member has a long strip-shaped structure extending along the second axis.

15. The optical system as claimed in claim 14, wherein
the first movable element has a first body and a clamping portion;
when viewed along the main axis, the clamping portion has a U-shaped structure;
the clamping portion radially extends from the first body;
the clamping portion is configured to clamp the driving member;
when the second movable element moves along the first axis, the driving member is configured to be in contact with the clamping portion to drive the first movable element to rotate around the main axis, thereby driving the first optical element to move relative to the first fixed assembly and the first movable assembly, so as to adjust the amount of external light entering the first optical element driving mechanism.

16. The optical system as claimed in claim 15, wherein
the second movable element has a second body;
the second body has a long strip-shaped structure extending along the first axis;
when viewed along the main axis, a length of the receiving trench in the first axis is greater than a length of the second body in the first axis;
the receiving trench has a middle receiving portion and two side receiving portions;
the two side receiving portions extend from the middle receiving portion along the first axis;
the middle receiving portion is configured to accommodate the second body.

17. The optical system as claimed in claim 16, wherein
the second frame further comprises at least three receiving grooves, extending along the first axis;
the first optical element driving mechanism further comprises a second rolling assembly disposed between the second movable element and the second frame;
the second rolling assembly comprises at least three second rolling elements, which are respectively disposed in the at least three receiving grooves;
the second movable element moves along the first axis relative to the second frame by the second rolling elements;
when viewed along the main axis, the second rolling elements form a triangle;
the triangle is an isosceles triangle.

18. The optical system as claimed in claim 17, wherein
the first driving assembly comprises two first magnetic elements fixedly disposed on the second movable element;
the two first magnetic elements are arranged along the first axis;
the second optical element driving mechanism further comprises a magnetic member disposed in the receiving trench;

in the second axis, the second movable element is located between the two first magnetic elements and the magnetic member;

a magnetic attraction force is generated between the two first magnetic elements and the magnetic member, so that the second movable element is not separated from the receiving trench.

19. The optical system as claimed in claim 18, wherein the first optical element driving mechanism further comprises a blocking member having a long strip-shaped structure extending along the first axis;

the blocking member is fixedly arranged in the two side receiving portions;

the second movable element further comprises two receiving structures disposed on opposite sides of the second body;

the blocking member is suspended in the two receiving structures;

the blocking member is not in contact with the receiving structures;

the blocking member is not in contact with the second body.

20. The optical system as claimed in claim 19, wherein when viewed along the second axis, the two first magnetic elements overlap the magnetic member;

when viewed along the second axis, an area of the magnetic member is larger than a total area of the two first magnetic elements;

when viewed along the second axis, the blocking member overlaps the two first magnetic elements;

when viewed along the second axis, the blocking member does not overlap the driving member;

when viewed along the second axis, the clamping portion overlaps a portion of the blocking member;

when viewed along the second axis, a length of the blocking member in the first axis is greater than a length of the second body in the first axis.

* * * * *